Patented Feb. 19, 1952

2,586,579

UNITED STATES PATENT OFFICE 2,586,579

METHOD OF PRODUCTION OF CUPROUS OXIDE AND COPPER CHLORIDES

Lester D. Supiro, Asbury Park, N. J., assignor to Sty-Jar Products, Inc., Newark, N. J.

No Drawing. Application January 30, 1948, Serial No. 5,495

3 Claims. (Cl. 23—97)

My invention relates to the production of cuprous oxide, cuprous chloride, and cupric chloride, and more particularly to a method for the production of cupric chloride and Grade A cuprous oxide using mixed copper oxides, hydrochloric acid, and water as the reacting substances. My invention further relates to the separation of cuprous oxide from cupric oxide in mixtures of these two compounds.

An object of my invention is to eliminate the need for electrolytic or thermal techniques presently used for the production of Grade A cuprous oxide, thereby greatly reducing the cost of production of this compound. This will make for a lower-priced product and thus encourage its more widespread use.

Another object of my invention is to utilize the energy already expended in the formation of cuprous oxide in certain mixtures of this compound with cupric oxide. By separating the cuprous oxide from the cupric oxide and then reconverting the separated cuprous compound to cuprous oxide, it is not necessary to expend energy to convert metallic or cupric copper to the cuprous state, as in other processes.

A further object of my invention is to provide an effective and efficient method for the utilization of mixed copper oxides whereby each of the copper oxides is converted into a useful compound.

A further object of my invention is to provide a system which is almost 100% efficient in its utilization of scrap and by-product mixtures of copper oxides, thereby eliminating the high copper losses characteristic of the thermal processes presently in use.

A further object of my invention is to provide a system which can remove silica from mixtures of copper oxides, thereby permitting such mixtures of copper oxides to be used for the production of Grade A cuprous oxide as well as for the production of other copper compounds where low silica content is mandatory.

When copper is drawn into wire or rods, or rolled into sheets, its surface oxidizes and scales. This scale contains high percentages of cuprous oxide mixed with cupric oxide. Sometimes this copper scale is reconverted into metallic copper, an operation characterized by poor copper recoveries. Other times it is ground and sold as low grade cuprous oxide.

If the scale has been removed from the copper surface by treatment with sand, it is contaminated with a high percentage of silica, which prevents the use of this material for practically all purposes except as a copper-bearing material for resmelting. My invention provides a low-cost method for the removal of this silica with negligible copper losses.

Cuprous oxide is classified commercially according to purity and particle size. Grade A cuprous oxide is of very fine particle size and of high purity, and must meet the following specifications:

Cuprous oxide _____ 97.0%
Copper _____ 86.0%
Chloride ion _____ 0.4% max.
Sulphate ion _____ 0.1% max.
Acetone soluble matter _____ 0.5% max.
Nitric acid insolubles (silica) _____ 0.3% max.
Metals other than copper _____ 0.5% max.
Particle size, residue on −325 mesh screen _____ 0.5% max.

The process which is described below provides a means for production of Grade A cuprous oxide from copper scale as well as from by-product and primary copper materials. Cupric chloride is a by-product of the operation, but the ratio of cuprous oxide (or cuprous chloride) to cupric chloride produced may be varied at will, to the point of complete production of cuprous oxide (or cuprous chloride).

Copper scale, mixed copper oxides resulting from the reclamation of ore tailings by the ammonia process, mixed copper oxides resulting from the treatment of copper ores or metallic copper in a converter, may all be utilized in this process. Metallic copper (primary forms or scrap wire, clippings, stampings etc.) may be used in combination with any of the above materials for the purpose of controlling the relative proportions of cuprous oxide (or cuprous chloride) and cupric chloride produced.

Black cupric oxide in combination with metallic copper may also be used under the conditions of this process.

The mixed copper oxides or the copper scale must be ground to −150 mesh or smaller in order to produce −325 mesh cuprous oxide and cuprous chloride.

For the production of Grade A cuprous oxide, the analysis of the copper materials should conform to the following specifications:

Chloride ion _____ 0.4% max.
Sulphate ion _____ 0.1% max.
Acetone soluble matter _____ 0.5% max.
Metals other than copper _____ 0.5% max.
Nitric acid insolubles (silica) _____ 0.3% max.

Certain copper scales may contain 2–3% silica, and thus not meet the specification for nitric acid insolubles. The silica may be removed by a special application of this process. This is described below.

The yellow commercial hydrochloric acid (20 degrees Baumé) is suitable for use in this process. A typical analysis is as follows:

| | |
|---|---|
| Fixed solids | 0.01% |
| Free chlorine | Trace. |
| Sulphate ion | Trace. |
| Iron | 0.0005% |
| Organics | Trace. |

This process takes advantage of the fact that the mixed copper oxides usually high percentages of cuprous oxide mixed with lower percentages of cupric oxide. The process effects the separation of these oxides by means of the formation of the chlorides, cuprous chloride being insoluble and cupric chloride being soluble under the conditions of the reaction.

The two copper chlorides are separated by filtration, the cuprous chloride washed with water until free of cupric chloride, and the wash water added to the cupric chloride filtrate. By further washing, the cuprous chloride is hydrolized to the red cuprous oxide:

$$2CuCl + H_2O \rightleftarrows Cu_2O + 2HCl$$

In order to prevent the reverse reaction from taking place, the hydrochloric acid is removed as it is formed. This is done by continuous rather than by batch washing of the cuprous chloride.

Both the filtration and the hydrolysis are carried out in a manner which prevents the oxidation of the cuprous chloride. A washing-type filter press is suitable for this purpose.

The cuprous oxide must be dried in an inert atmosphere and should be agitated while drying to prevent lumping. A rotary vacuum drier is suitable for this operation.

If cuprous oxide is not to be produced, the cuprous chloride is washed with dilute hydrochloric acid until free of cupric chloride. The dilute hydrochloric acid is used instead of water to prevent the hydrolysis to cuprous oxide. The cuprous chloride is then dried in a rotary vacuum drier.

The cupric chloride solution is evaporated and crystallized, the crystals centrifuged and dried. They can be produced either as crystalline $CuCl_2 \cdot 2H_2O$, or further dried to the anhydrous salt.

Theoreticaly, cuprous oxide and cupric oxide react with hydrochloric acid as follows:

$$Cu_2O + 2HCl \rightleftarrows 2CuCl + H_2O$$
$$CuO + 2HCl \rightleftarrows CuCl_2 + H_2O$$

The gram molecular weight of cuprous oxide is 143.2 grams and that of cupric oxide is 79.6 grams. One mole of either oxide requires two moles of hydrochloric acid according to the above equations. Therefore, in any mixture of these two oxides, the greater the proportion of the cupric oxide the greater the amount of hydrochloric acid needed to effect the separation.

On the basis of the above equations, 2000 lbs. of a mixture consisting of 50% cuprous oxide and 50% cupric oxide requires a total of 1428 lbs. of anhydrous hydrogen chloride or 460.6 gallons of 20 deg. Bé. hydrochloric acid for the separation of the two copper oxides. In practice, however, 400 gallons of the 20 deg. Bé. hydrochloric acid is sufficient. This is due to the partial formation of an intermediate cuprous compound, insoluble under the conditions of the reaction, and possibly of the form $Cu_2O \cdot HCl$. This intermediate cuprous compound hydrolizes to cuprous oxide equally as well as the cuprous chloride.

While four hundred gallons of the 20 deg. Bé. hydrochloric acid is sufficient for the separation of the two copper oxides, this amount of acid should be used only when the precipitated cuprous compound is to be converted to cuprous oxide. If cuprous chloride is to be produced, the theoretical amount (460.0 gallons) of the 20 deg. Bé. hydrochloric acid must be used. This is done to avoid the coprecipitation of any insoluble intermediate cuprous compound which would affect the purity of the cuprous chloride.

As the 20 deg. Bé. hydrochloric acid is added to the mixed copper oxides, cuprous oxide reacts at a faster rate than does the cupric oxide, forming first the cuprous chloride precipitate and then the complex cuprous ion:

$$\overset{ppt.}{CuCl} + Cl^- \rightarrow CuCl_2^- \text{ (in solution)}$$

The complex cuprous ion forms even though some of the cupric oxide may yet be unreacted. This is understandable in view of the small dissociation constant of cuprous chloride and the even smaller dissociation constant of the complex cuprous ion.

As more 20 deg. Bé. hydrochloric acid is added, some of this additional acid will form additional complex cuprous ion and some will react with the unreacted cupric oxide to form additional cupric chloride. When all of the acid has been added, and the cupric oxide has completely reacted, an equilibrium is reached. At this point, the following conditions exist:

(1) A white precipitate of cuprous chloride (and/or the intermediate cuprous compound).
(2) A supernatant solution consisting of:
   (a) Cupric chloride.
   (b) Cuprous chloride complex ion.
   (c) Complex ion consising of (a) and (b).

The complex ions must be destroyed in order to effect an efficient separation of cuprous chloride from cupric chloride and to avoid contamination of the cupric chloride solution with cuprous ion. This can be done by dilution with water or by the addition of a base. In this case, the mixture of copper oxides serves as the base. However, cuprous oxide alone or cupric oxide alone can also be used for this purpose.

Dilution with water increases evaporation costs and wastes the excess hydrochloric acid, but is easy to control. On the other hand, neutralization with copper oxides permits the utilization of the excess acid, keeps the evaporation costs at a minimum, but is more difficult to control since there is a possibility of precipitating some of the cupric chloride as cupric oxychloride or cupric oxide if an excess of the copper oxides is added.

If the supernatant solution is diluted with water to destroy the complex ions, the precipitate of cuprous chloride is filtered, and the filtrate of cupric chloride is then evaporated. Four hundred gallons of water per ton of a mixture containing 50% of cuprous oxide and 50% of cupric oxide are required to break the complex ions. For the sake of simplifying the operation and avoiding another filtration, the water can be added at the beginning of the reaction.

If the supernatant solution is not diluted with water, the cuprous chloride precipitate is filtered off, the filtrate returned to a reaction tank and treated with the copper oxides until the complex ions are destroyed, then decanted through a clarifying filter press and evaporated. More of the mixture of copper oxides is now added to the residue in the tank together with more hydrochloric acid, and the cycle begins again.

In the case of mixtures of copper oxides which contain silica, the silica may be removed by a method which takes advantage of the solubility of cuprous chloride in large excesses of concentrated hydrochloric acid. Silica is insoluble in hydrochloric acid.

The silica-containing mixed copper oxides are treated with 20 deg. Bé. (or stronger) hydrochloric acid as before to form cuprous chloride and cupric chloride. The addition of the hydrochloric acid is continued until all the cuprous chloride goes into solution:

$$CuCl_{solid} + Cl^- \rightarrow CuCl_2^- \text{ (complex cuprous ion in solution)}$$

When this has been accomplished, the entire solution is filtered through a suitably fine medium in a clarifying filter press until the silica has been removed. Care must be taken to flush out thoroughly the reaction vessel and the pump and lines. The cuprous chloride is now reprecipitated by diluting the solution with water, or by the addition of silica-free copper oxides.

If it is desired to increase the ratio of the yield of cuprous oxide (or cuprous chloride) to cupric chloride, the cupric chloride solution is treated with metallic copper, heated to boiling, and reduced to cuprous chloride:

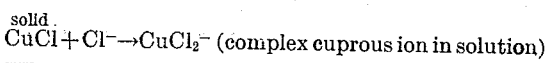

The reaction will be more rapid and more complete if some excess hydrochloric acid is present to convert cuprous chloride to the complex cuprous ion, since the complex ion yields a lower concentration of cuprous ion to the solution than does the cuprous chloride. After the cuprous chloride is filtered off, the complex ions can be destroyed by the methods already described.

Metallic copper in the form of wire, sheet, shot, or copper in any other form which exposes large amounts of surface may be used. The copper may be contained in a perforated rubber covered basket, which is placed in the reaction tank. By controlling the amounts of copper added, the proportions of cuprous oxide and cupric chloride produced can be regulated.

The hydrolysis of the cuprous chloride (and/or intermediate cuprous compound) to cuprous oxide is a continuous process, as noted above. When the hydrolysis is carried out in this continuous manner, it is possible to use cold water as well as hot or boiling water. Steam can also be used effectively, either alone or in alternation with liquid water. A washing type filter press or similar device may be used to perform this type of continuous hydrolysis, as noted above.

In the past, cuprous chloride has been hydrolyzed in the laboratory by boiling with water. As the hydrolysis proceeds, a constant boiling solution of hydrochloric acid and water is formed, and an equilibrium is reached which prevents the hydrolysis from going to completion:

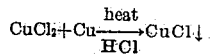

Additional water must now be added and the boiling continued, and so on, until the reaction approaches completion.

The continuous method of hydrolysis prevents the establishment of such an equilibrium by providing for the continuous removal of the hydrochloric acid. If it is economically feasible, the hydrochloric acid may be recovered and re-used.

Of course a base may be used to effect the hydrolysis of the cuprous chloride to cuprous oxide. Any base may be used which yields a soluble salt as a result of the neutralization of the cuprous chloride (sodium hydroxide, for example). The resultant cuprous oxide is then washed with water until free of the soluble salt. Although the hydrolysis reaction with a strong base such as sodium hydroxide proceeds much faster than with the water, the water still proves more economical when all other factors are considered.

Cuprous chloride is somewhat soluble in hot water, its solubility curve being very steep. Therefore, in order to effect a thorough separation of cuprous chloride from cupric chloride, and to avoid losses when cupric chloride is reduced to cuprous chloride, the reaction mixture must be cooled. In practice, cooling the reaction mixture to 20° C. before attempting any sort of filtration, has proved satisfactory. Similarly, when hydrolizing the cuprous chloride to the oxide, the hydrolysis reaction is started with water which has a maximum temperature of 20° C. This preliminary hydrolysis converts the cuprous chloride to the insoluble intermediate compounds which then may be treated with hot water or steam, as described above, to complete the hydrolysis.

*Example I.—Production of cuprous oxide and cupric chloride*

| | | |
|---|---|---|
| Cuprous and cupric oxide mixture (1:1) | lb | 2000 |
| Water | gal | 400 |
| Hydrochloric acid 20° Bé | gal | 400 |

PROCEDURE

1. Mix. (The initial acid concentration is approximately 17.3% by weight when mixed with the water.)
2. Cool to 20° C.
3. Separate insoluble cuprous residue from supernatant cupric chloride solution.
4. Wash residue with water no hotter than 20° C. (to avoid loss of cuprous residue) until free from cupric chloride.
5. Continue to wash with water no hotter than 20° C. until no cuprous chloride remains (it is converted into an intermediate insoluble cuprous compound as aforementioned).
6. (a) Hydrolyze residue with water higher than 20° C. or steam, until it is all converted to cuprous oxide (the wash water is free from hydrochloric acid when hydrolization is complete).
   (b) Or as an alternative to step 6 (a), add a sodium hydroxide solution slowly until the mixture becomes neutral or slightly alkaline; then wash out the sodium chloride thus formed with water until the rinse appears free from the sodium chloride; the residue is then cuprous oxide which may be dried.
7. Dry the residue in a suitable atmosphere.

*Example II.—Production of cuprous chloride and cupric chloride*

| | | |
|---|---|---|
| Cuprous and cupric oxide mixture (1:1) | lb | 2000 |
| Water | gal | 400 |
| Hydrochloric acid 20° Bé | gal | 460.6 |

PROCEDURE

1. Mix. (The initial acid concentration is approximately 18.4% by weight when mixed with the water.)
2. Cool to 20° C.
3. Separate residual cuprous chloride residue from the supernatant cupric chloride solution, by washing with dilute hydrochloric acid until effluent is free from cupric chloride still maintaining below 20° C.
4. Dry the residual cuprous chloride.

By properly controlling the concentrations and amounts of the reactants, and by controlling the reaction and drying temperatures, it is possible to produce by means of this process a cuprous oxide product of extremely fine and uniform particle size.

Having thus described my invention, I claim:

1. The method of producing cuprous oxide and cupric chloride from mixtures of cuprous and cupric oxides comprising reacting a mixture of cuprous and cupric oxides with hydrochloric acid of a concentration less than approximately 18% in the amount up to 2 moles of hydrogen chloride to each mole of each oxide, cooling the mixture to 20° C., removing the insoluble cuprous residue from the cupric chloride solution, washing cupric chloride from the residue with water cooler than 20° C., further washing the residue with water cooler than 20° C. until cuprous chloride is converted to other insoluble cuprous compounds, hydrolyzing the residue with water hotter than 20° C. until all of the insoluble cuprous residue is converted into cuprous oxide, drying the residue.

2. The method of producing cuprous oxide and cupric chloride from mixtures of cuprous and cupric oxides comprising reacting a mixture of cuprous and cupric oxides with hydrochloric acid of a concentration less than approximately 18% in the amount up to 2 moles of hydrogen chloride to each mole of each oxide, cooling the mixture to 20° C., removing the insoluble cuprous residue from the cupric chloride solution, washing cupric chloride from the residue with water cooler than 20° C., neutralizing the residue with a base that forms soluble chlorides, washing the soluble chlorides from the residue, drying the residue.

3. The method of producing cuprous chloride and cupric chloride from a mixture of cuprous and cupric oxides comprising reacting a mixture of cuprous and cupric oxides with hydrochloric acid of a concentration less than approximately 18% in the amount of 2 moles of hydrogen chloride to each mole of each oxide, cooling the mixture to 20° C., removing the cuprous chloride residue from the cupric chloride solution, washing out the cupric chloride from the residue with dilute hydrochloric acid at less than 20° C., drying the residual cuprous chloride.

LESTER D. SUPIRO.

REFERENCES CITED

The following references are of record in the file of this patent:

UNITED STATES PATENTS

| Number | Name | Date |
|---|---|---|
| 1,263,728 | Anderson | Apr. 23, 1918 |

OTHER REFERENCES

Seidell: Solubilities of Inorganic and Organic Compounds, D. Van Nostrand, N. Y., vol. 1, 2nd ed. (1919), pages 264 and 265.

Roscoe et al.: Treatise on Chemistry, Macmillan, London, vol. 2 (1907), pages 420 and 421.

Mellor: Comprehensive Treatise on Inorganic and Theoretical Chemistry, vol. III, Longmans, Green & Co., N. Y. (1923), pages 157–161.

Jacobson: Encyclopedia of Chemical Reactions, vol. III (1949), Reinhold Publ. Co., N. Y., pages 320, 322, 329, 354.